Feb. 2, 1937. R. D. HILL 2,069,443
STUFFING BOX
Filed Aug. 3, 1934
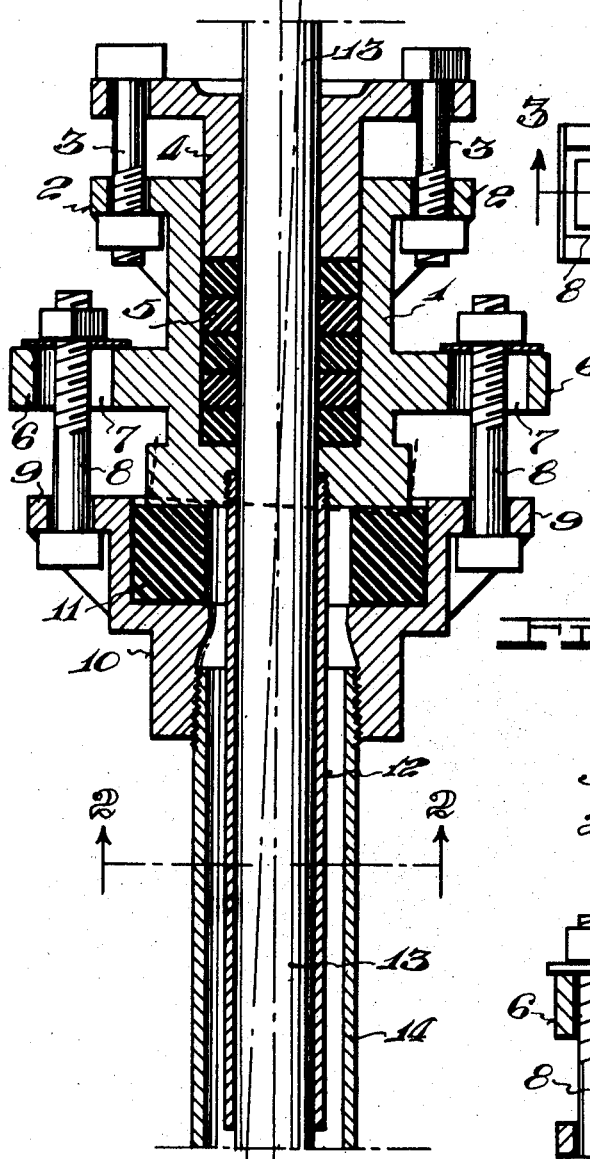
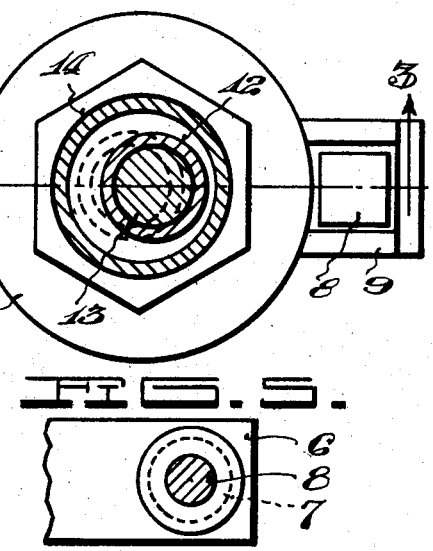
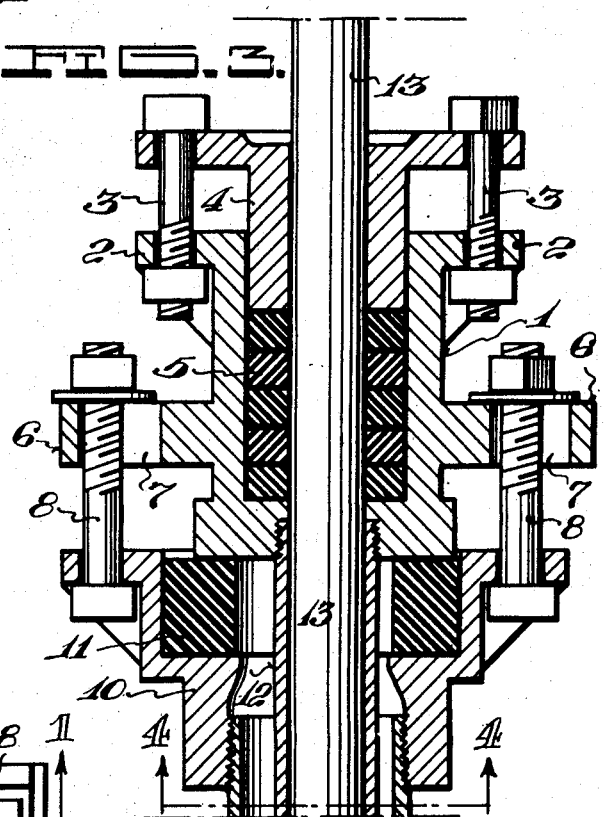
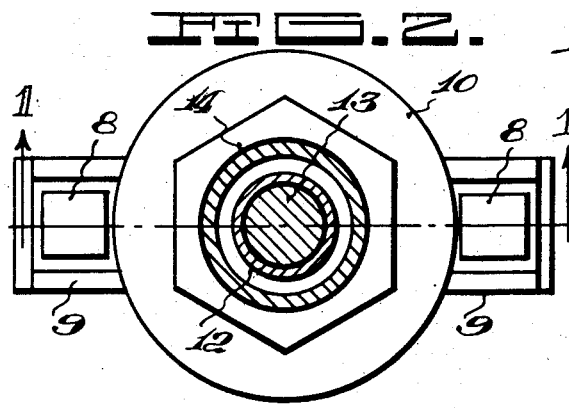
Richard D. Hill
INVENTOR
ATTORNEY Patented Feb. 2, 1937

2,069,443

UNITED STATES PATENT OFFICE 2,069,443

STUFFING BOX

Richard D. Hill, Wichita Falls, Tex., assignor of twenty-five per cent to Ralph Decker, twenty-five per cent to W. L. Robertson, and fifty per cent to L. D. Mowrey, all of Wichita Falls, Tex.

Application August 3, 1934, Serial No. 738,174

1 Claim. (Cl. 286—15)

This invention relates to well pumping apparatus and it has particular reference to improvements in stuffing boxes.

The principal object of the invention is to provide a stuffing box which is capable of following the lateral movements of the polished rod in its travel, caused by its more or less arcuate path when separated by the conventional jack or walking beam and combined with this object, is the further object of protecting the stuffing box packing from the surge of fluid which arises in the tubing.

Another object of the invention is to provide a stuffing box combined with or capable of being attached to an element which allows for more or less universal displacement of the stuffing box in order that it may follow the movements of the rod and thereby prolong the usefulness of the packing therewithin and yet will not impose frictional wear upon the rod to cause possible crystallization thereof and consequent ultimate breakage which is frequently the case in conventional types of stuffing boxes.

With the foregoing objects as paramount, the invention has particular reference to its salient features of construction and arrangement of parts which will become manifest as the description proceeds, taken in connection with the accompanying drawing, wherein:—

Figure 1 is an elevation of the invention in axial section taken on lines 1—1 on Figure 2.

Figure 2 is a view on lines 2—2 on Figure 1.

Figure 3 is a view similar to Figure 1 but shows the stuffing box displaced relative to its mounting, and is taken on lines 3—3 on Figure 4.

Figure 4 is a view on lines 4—4 on Figure 3, and

Figure 5 is a detail view of one of the lateral arms broken away from the body of the stuffing box.

Continuing with a more detailed description of the drawing, 1 designates the main body of the stuffing box, having at its top a pair of diametrically opposed ears 2 and which are apertured to receive bolts 3. A flanged packing retainer 4 is held in adjustable relation to the packing 5 by the bolts 3 as apparent in Figures 1 and 3.

Midway between the ends of the body 1, diametrically opposed arms 6 are provided which have apertures 7 therein whose diameters are considerably greater than the diameter of the bolts 8 which are required to pass therethrough and engage apertured ears 9 carried upon the upper end of the lower member or mounting 10 of the stuffing box. The fact that the openings or apertures 7 are larger than bolts 8 permits of movement of the body 1 or stuffing box proper with respect to the mounting or lower portion 10, the advantage of which is obvious but will be again mentioned presently.

With the mounting 10 is provided secondary, packing 11 of comparatively soft resilient material such as rubber or some other suitable composition. This packing surrounds the tubular sleeve 12, the latter in turn snugly embracing the polished rod 13 and which is threaded into the lower end of the body 1 of the stuffing box. The function of the sleeve 12 is of great importance and aids considerably in prolonging the life of the stuffing box. Ordinarily, fluid surges upwardly against the stuffing box packing in the rigid or conventional type of stuffing box, on the upward stroke of the pump rod and since some sand is usually entrained in the fluid, the packing wears rapidly and must be frequently replaced. It is obvious from an examination of Figures 1 and 3 that packing 5 is isolated from the fluid by the sleeve 12 and only the secondary packing 11 is exposed thereto which is of no consequence since the latter packing is not subjected to the frictional wear of the rod 12.

Accordingly, the lower member or mounting 10 is threaded upon the tubing 14 by a suitable wrench or the like applied to the lower portion of the member. The stuffing box 1 is then applied to the mounting and secured thereto by bolts 8. As the rod 13 moves upward, it is displaced relative to the tubing 14 and mounting 10 in the manner illustrated in Figures 3 and 4. Due however, to the size of the apertures 7 in comparison to that of the bolts 8, the stuffing box 1 is capable of sliding or compressing the packing 11 and thereby follows the rod 13. This is true also of the downward stroke of the rod 13 as well as any lateral movements of the rod. In any case however, the packing 5 is protected against undue wear both from the standpoint of wear which would ordinarily be imposed thereon by the arcuate travel of the rod or deviation from the perpendicular and from the standpoint of the wear which would otherwise be assumed as imposed by sand laden fluid. The sleeve 12 positively protects the packing 5 against the latter condition.

Manifestly, the construction shown is capable of considerable modification and such modification as is considered within the spirit and intent of the invention is also considered within the scope and meaning of the appended claim.

What is claimed is:

Means for packing a polish rod comprising a stuffing box and a support mounted upon the well tubing, said support having an annular recess therein, one end of said stuffing box extending into the recess and normally peripherally spaced from the wall thereof, a resilient packing in said recess upon which the stuffing box rests, packing means within the stuffing box surrounding the polish rod, means connecting the stuffing box and support together for relative movement therebetween, and a sleeve fixed to the stuffing box and closely embracing said rod for movement therewith during movement of the stuffing box end in said recess, said sleeve extending into the well tubing a distance below the lower end of the support to retard passage of liquid upwardly between the said rod and stuffing box packing.

RICHARD D. HILL.